United States Patent [19]

Moriguchi et al.

[11] Patent Number: 4,463,301

[45] Date of Patent: Jul. 31, 1984

[54] STEP MOTOR DRIVING CIRCUIT

[75] Inventors: Fujio Moriguchi; Tomio Murayama; Takashi Ohmori, all of Kanagawa, Japan

[73] Assignee: Fuji Xerox Co., Ltd., Tokyo, Japan

[21] Appl. No.: 396,547

[22] Filed: Jul. 9, 1982

[30] Foreign Application Priority Data

Jul. 10, 1981 [JP] Japan .................................. 56-106903

[51] Int. Cl.³ .......................................... H02K 29/02
[52] U.S. Cl. .................................... 318/696; 318/685
[58] Field of Search .............. 310/49 R; 318/696, 685

[56] References Cited

U.S. PATENT DOCUMENTS 3,445,741  5/1969  Gerber ............................ 310/49 R Primary Examiner—B. Dobeck
Assistant Examiner—Saul M. Bergmann
Attorney, Agent, or Firm—Sughrue, Mion, Zinn, Macpeak, and Seas

[57] ABSTRACT

A step motor driving circuit having A-phase and B-phase exciting windings which are independently supplied with exciting current in a sequence of four states per step of the step motor. The driving circuit is capable of applying a large or a small current to each phase winding and the currents are applied in a sequence to result in a trapezoidal shaped exciting current. During a first state only one phase is excited and it is excited with the large current. During the second state the one phase is excited with the large current and the other phase with the small current. During the third state both phases are excited with large currents. During the fourth state the one phase is excited with the small current and the other phase with the large current.

10 Claims, 16 Drawing Figures

FIG. 5

| MEMORY OUTPUT TERMINAL / MEMORY ADDRESS | ① | ② | ③ | ④ | ⑤ | ⑥ |
|---|---|---|---|---|---|---|
| 0 | 1 | 0 | 0 | 1 | 1 | 0 |
| 1 | 1 | 0 | 0 | 0 | 1 | 0 |
| 2 | 1 | 0 | 1 | 0 | 1 | 0 |
| 3 | 1 | 0 | 1 | 0 | 1 | 1 |
| 4 | 1 | 0 | 1 | 0 | 0 | 1 |
| 5 | 0 | 0 | 1 | 0 | 0 | 1 |
| 6 | 0 | 1 | 1 | 0 | 0 | 1 |
| 7 | 0 | 1 | 1 | 0 | 1 | 1 |
| 8 | 0 | 1 | 1 | 0 | 1 | 0 |
| 9 | 0 | 1 | 0 | 0 | 1 | 0 |
| 10 | 0 | 1 | 0 | 1 | 1 | 0 |
| 11 | 0 | 1 | 0 | 1 | 1 | 1 |
| 12 | 0 | 1 | 0 | 1 | 0 | 1 |
| 13 | 0 | 0 | 0 | 1 | 0 | 1 |
| 14 | 1 | 0 | 0 | 1 | 0 | 1 |
| 15 | 1 | 0 | 0 | 1 | 1 | 1 |

STEP MOTOR DRIVING CIRCUIT

BACKGROUND OF THE INVENTION

The present invention relates to a driving circuit for a step motor which is suitable for carrying a rolled recording paper stepwise in a recorder such as a facsimile machine or printer.

In the case of a facsimile machine, for example, in order to record a picture on recording paper delivered from a feed roll, a step motor is used for a carrier mechanism to move the recording paper stepwise in the sub-scanning direction.

FIG. 1 represents a step motor driving circuit employed in the prior art for the carrier mechanism of the kind mentioned above. Each of the exciting coils 11-14 of a four phase winding wound on pole teeth of a stator (not illustrated) has one end grounded. The other ends of the four coils are connected to emitters of corresponding switching transistors 15-18 for on/off control of an exciting current for each coil. Collectors of the first and second transistors 15 and 16 are connected to a power line 21 through a resistor 19, and collectors of the third and fourth trnsistors 17 and 18 are also connected to the same power line 21 through a resistor 22. Control signals are inputted to the bases of the first to fourth transistors 15-18 from a control unit (not illustrated), thereby carrying out on/off control therefor.

When transistors 15-18 are rendered conductive in order, the coils 11-14 are excited successively, and a rotor (not illustrated) then rotates correspondingly to obtain a stable position in a changing direction of the excitation. The resistors 19 and 22 are used in the circuit to decrease an electrical time constant. Therefore response to an input signal is quick, control of rotational speed is comparatively easy, and open-loop control for which feedback is not required can be effected. On the other hand, an overshoot occurs at every step, and the carrier system of the recorder is subject to vibrations. When vibrations occur, a satisfactory recording will not be obtainable from the recording paper moving to a given position until the vibrations attenuate to some extent. Thus, if the system operates to insure a still time of the recording paper at each subscanning point for better recording, it will not be possible to obtain a high-speed recording. Another problem is that in high speed recording the vibrations accumulate from shifting to the next step operation before the complete attenuating of the vibrations of the step motor due to overshoot thus causing a step miss.

One proposal for solving the above problems includes a method to obtain a comparatively long still time for recording by moving the recording paper at the shortest possible time and reducing the vibrations of the step response. This method is represented by FIG. 2. A negative-phase clock (FIG. 2 at (b)) is generated between two positive-phase clocks (FIG. 2 at (a)), and an exciting step moving counter to the desired rotation is mixed into the motor when a state is changed. Vibrations of the step response are thus reduced as shown in FIG. 2 at (c). However, according to this method, a rotation vector is generated counter to the direction in which the rotor runs. Therefore the rotation torque of the rotor is not fully utilized.

SUMMARY OF THE INVENTION

In view of the above circumstances, an object of the present invention is to provide a step motor driving circuit utilizing most of the torque generated by the motor and capable of suppressing vibrations of the step response.

The above object will be attained by providing two exciting currents with their mean value changing with a trapezoidal waveform and their sum changing stepwise and feeding them to exciting coils of each phase and carrying a sequence of double 1-phase and 2-phase excitation.

BRIEF DESCRIPTION OF THE DRAWINGS

FIG. 3-FIG. 9 represent one preferred embodiment of the invention:

FIG. 3 is a circuit diagram of a step motor driving circuit,

FIG. 4 is a timing chart representing the sum of a clock signal and an exciting current flowing to both exciting coils, FIG. 5 is a drawing representing a relation between a memory address and a logic signal appearing on each output terminal, FIG. 6 is a waveform diagram representing a change in time of a voltage appearing on an output terminal of a detection voltage dividing transfer circuit, FIG. 7 is a waveform diagram representing a change in voltages $V_A$, $V_B$ appearing on both ends of each current detection resistance when address 0 of the memory is accessed, FIG. 8 is an explanatory drawing representing a step operation of a rotor, and FIG. 9 is a characteristic drawing representing a carrying characteristic of a recording paper by a carrier mechanism using the step motor driving circuit.

DETAILED DESCRIPTION OF THE PREFERRED EMBODIMENT

Figure 1:
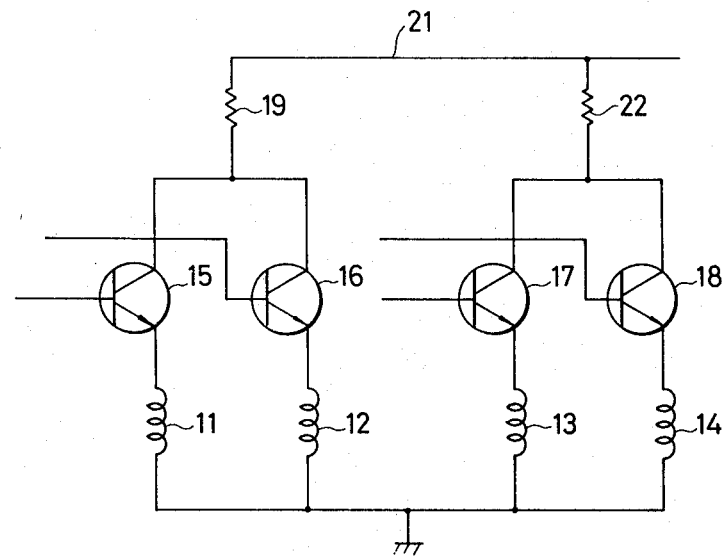
FIG. 1 is a circuit diagram representing a main part of a conventional step motor driving circuit.
Figure 2:
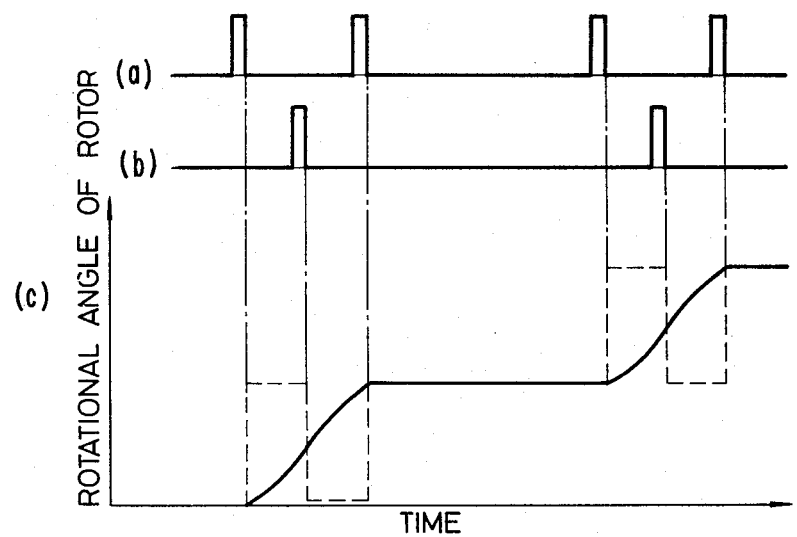
FIG. 2 is an explanatory drawing representing a driving principle of a step motor suggested previously for reduction of vibrations of a step response.
Figure 3:
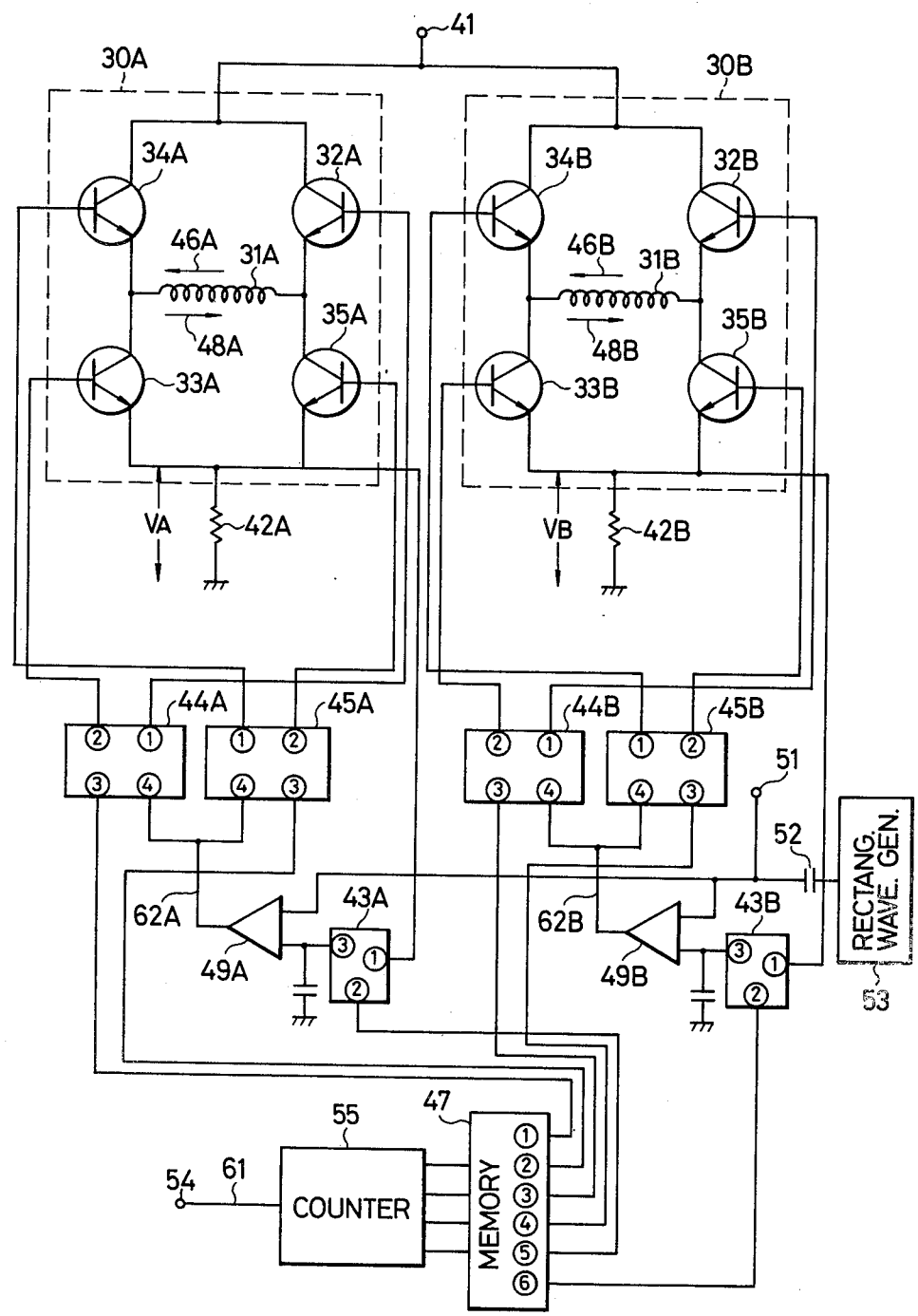

FIG. 3 represents a step motor driving circuit for a two-phase motor having two phases A and B. In the circuit, an A-phase exciting coil 31A wound on a pole tooth of a stator (not illustrated) and four switching transistors 32A-35A constitute the first bipolar excitation basic circuit 30A. A B-phase exciting coil 31B and four switching transistors 32B-35B constitute likewise the second bipolar excitation basic circuit 30B. The collectors of transistors 32A and 34A are connected to an exciting current feeding motor power terminal 41 and the emitters are connected across the exciting coil 31A. The emitters of transistors 33A and 35A are grounded through a first current detection resistance 42A and are also connected to an input terminal 1 of a first detection voltage dividing transfer circuit 43A. The collectors of transistors 33A and 35A are connected across the exciting coil 31A. The bases of transistors 32A and 33A are connected to corresponding output terminals 1 and 2 of an A-phase driver circuit 44A, and the bases of transistors 34A and 35A are connected to corresponding output terminals 1 and 2 of $\overline{A}$-phase driver circuit 45A. The A-phase driver circuit 44A controls the flow of an exciting current to the exciting coil 31A in the direction indicated by arrow 46A. Input terminal 3 of circuit 44A is connected with the first output terminal 1 of a memory 47, which outputs a controlling logic signal. The $\overline{\text{A}}$-phase driver circuit 45A controls the flow of an exciting current to the exciting coil 31A in the direction indicated by arrow 48A. Input terminal 3 of circuit 45A is connected with the second output terminal 2 of the memory 47. Further, the input terminal 2 of the first detection voltage dividing transfer circuit 43A is connected with an output terminal 5 of the memory 47. When a logic signal is applied to the voltage dividing transfer circuit 43A from memory 47 a divided voltage is impressed on the first comparator 49A from an output terminal 3. A reference voltage input terminal 51 and a rectangular wave generating circuit 53 through an AC breaking condenser 52 are connected to a signal input terminal of the first comparator 49A, and a comparison output is supplied from the output terminal to an input terminal 4 of the driver circuits 44A and 45A.

Peripheral circuits of the second bipolar excitation basic circuit 30B are exactly the same in constitution as those of the first bipolar excitation basic circuit 30A, and those circuits are denoted by a subscript B instead of A. However, an input terminal 3 of a B-phase driver circuit 44B, an input terminal 3 of a $\overline{\text{B}}$-phase driver circuit 45B and an input terminal 2 of the second detection voltage dividing transfer circuit 43B are connected to corresponding output terminals 3, 4 and 6 of the memory 47, respectively. The address for the memory 47 is specified by a counter 55 receiving a supply of clock signals from a clock input terminal 54, and a given logic signal is outputted from the output terminals 1-6 of the memory 47.

Figure 4:
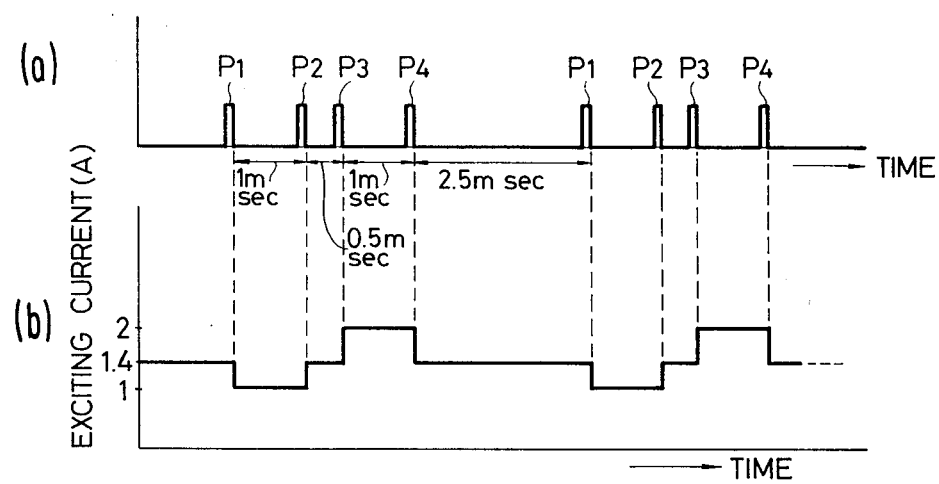

A clock signal 61 read from a ROM (not illustrated) is supplied to the clock input terminal 54 of the step motor driving curcuit. The clock signal consists of pulse groups having a period of 5 msec as shown in FIG. 4 at (a). Each pulse group consists of pulses $P_1$, $P_2$, $P_3$, and $P_4$ separated by intervals of 1, 0.5, and 1 msec, respectively. The first pulse, $P_1$, of the succeeding group is generated 2.5 msec after generation of pulse $P_4$. The counter 55 is a hexadecimal counter, and when the clock signal 61 is supplied thereto, it accesses addresses 0 to 15 of the memory 47 from the first pulse $P_1$ sequentially.

FIG. 5 represents the relationship of each address of the memory 47 to the logic signals appearing on the output terminals 1-6. Let it be assumed that the step motor driving circuit is closed, and address 0 of the memory 47 is accessed. In the above state, a signal "1" is outputted from the first, fourth and fifth output terminals 1, 4, 5, and a signal "0" is outputted from the other terminals 2, 3, 6. In this case, the A-phase driver circuit 44A and the $\overline{\text{B}}$-phase driver circuit 45B, to which the signal "1" is supplied, are in operation; transistors 32A and 33A in circuit 30A and transistors 34B and 35B in circuit 30B are in conduction. In this state, an exciting current flows from the motor power terminal 41 in the direction indicated by arrow 46A through the A-phase exciting coil 31A and in the direction indicated by arrow 48B through the B-phase exciting coil 31B.

When the exciting current flows, voltages $V_A$ and $V_B$ proportional to the current value appear across the first current detection resistor 42A and the second current detection resistance 42B. The voltages $V_A$ and $V_B$ are impressed on the corresponding first and second detection voltage dividing transfer circuits 43A and 43B, respectively. When the signal "0" is supplied to the input terminals 2, the detection voltage dividing transfer circuits 43A and 43B output the voltages $V_A$ and $V_B$, respectively, to the corresponding comparators 49A and 49B. When the signal "1" is supplied to the input terminals 2, a voltage value obtainable through multiplying the voltages $V_A$ and $V_B$ by 2/5 is outputted to the corresponding comparators 49A and 49B. When the address 0 of the memory 47 is accessed, the signal "1" is supplied only to the input terminal 2 of the first detection voltage dividing transfer circuit 43A. Therefore the voltage 2/5 $V_A$ is impressed on the first comparator 49A and the voltage $V_B$ is impressed on the second comparator 49B.

Figure 6:
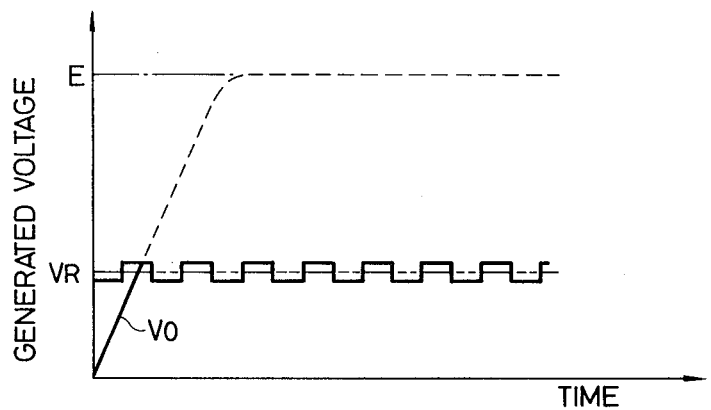

The comparators 49A and 49B compare voltages inputted from the detection voltage dividing transfer circuits 43A and 43B, respectively, with the reference voltage, onto which a rectangular wave is superimposed. The comparators output control signals 62A and 62B, respectively, to the corresponding driver circuits 44A, 44B, 45A and 45B only when the reference voltage plus the rectangular wave is larger than or equal to that of the output of the voltage dividing transfer circuit. Otherwise there will be no output. The driver circuits 44A, 44B, 45A, 45B will come into operation only when the signal "1" is supplied from the memory 47 and the control signal 62A or 62B is supplied from the corresponding comparator 49A or 49B. As shown in FIG. 6, therefore, a voltage $V_O$ outputted from the output terminal 3 of the detection voltage dividing transfer circuits 43A or 43B rises quickly from the time of logic signal for the address 0 is outputted and would climb up to a steady state voltage E without further control. However, it is subjected to on/off control by the rise and fall of the rectangular wave after it reaches equality with the reference voltage $V_R$ subjected to comparison by the comparator and is thus subjected to a constant current control.

Figure 7:
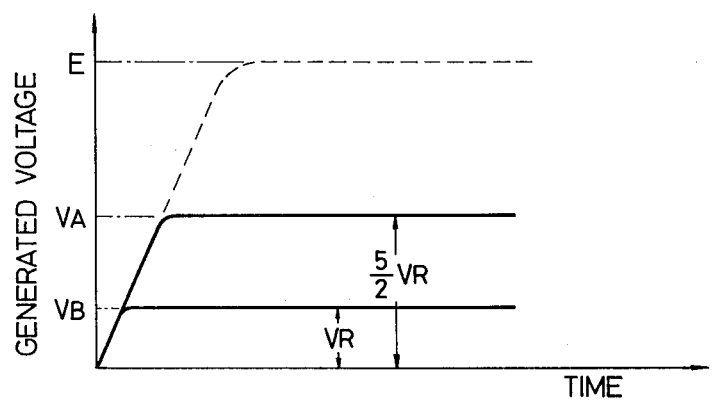

In this case, since transfer circuit 43A has a logic signal 1 applied to its input terminal 2 and transfer circuit 43B has a logic signal 0 applied to its input terminal 2, the voltages $V_A$ and $V_B$ will level off at different values. Voltage $V_B$ will level off at the reference voltage $V_R$ because $V_B$ appears at the output of circuit 43B as is compared with the reference. On the other hand, the voltage value 2/5 $V_A$ appears at the output of circuit 43A and is compared to $V_R$. The voltage $V_A$ will level off when 2/5 $V_A = V_R$. Thus the level off value of $V_A = 5/2$ $V_R$. This is shown in FIG. 7. Thus in the circuit described, an exciting current of value A flows to the A-phase exciting coil 31A at a balanced state, and an exciting current about 0.4 A flows to the B-phase exciting coil 31B.

Figure 8:
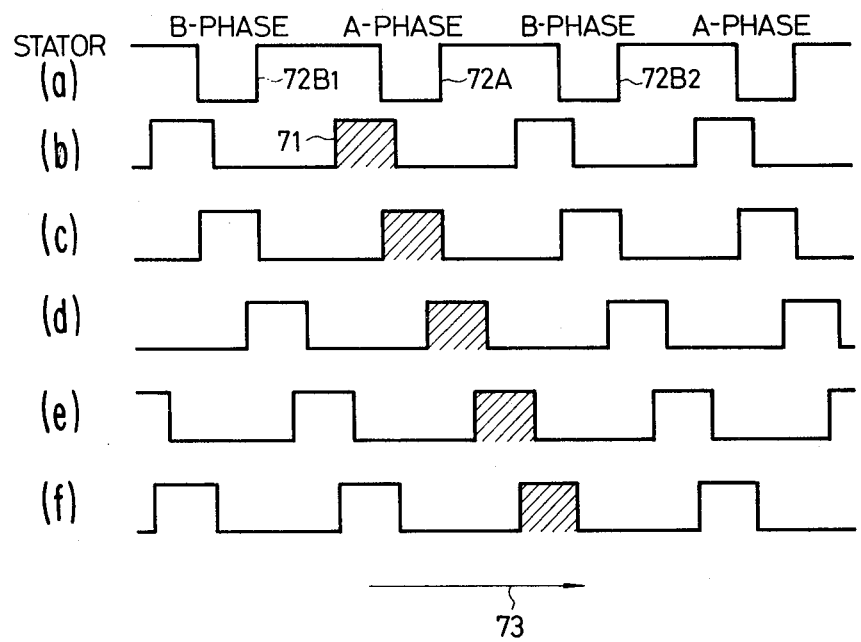

FIG. 8 represents the state wherein a rotor comes into a step operation. The top graph at (a) represents the stator teeth of the step motor, alternately wound with the A-phase and B-phase windings. The remaining graphs in FIG. 8 at (b) to (f) represent the rotor teeth, at positions relative to the stator teeth, during successive steps of the motor. As described above, in the state where the address 0 of the memory 47 is accessed, an exciting current 2.5 times of that applied to B-phase exciting coil 31B flows to the A-phase exciting coil 31A, and thus the exciting energy generated on the A-phase will be larger than that on the B-phase. Therefore, as indicated by cross-hatched zones, a pole tooth 71 of the rotor remains stationary between a pole tooth 72A of the stator on which the A-phase exciting coil 31A is wound and a pole tooth 72B₁ of the stator on which the B-phase exciting coil 31B is wound at a position near the former by an angle corresponding to the ratio of the exciting energy. Said position becomes the first change balanced point.

When a given period of time passes after the step motor driving circuit is closed and the first pulse $P_1$ is supplied to the counter 55 as a clock signal 61, the memory 47 has the address 1 accessed instead of the address 0. Then, as shown in FIG. 5, the A-phase driver circuit 44A operates according to the divided voltage 2/5 $V_A$ of the first current detection resistor 42A, and the B-phase driver circuit 44B is placed in an inoperative state. In this case, about 1A of exciting current flows to the A-phase exciting coil 31A, and the A-phase only is excited. In this state, the rotor is magnetically attracted to step to a position where the A-phase stator pole tooth 72A and the rotor pole tooth 71 face each other. (FIG. 8 at (c)).

When 1 msec passes after the address 1 of the memory 47 is accessed, the second pulse $P_2$ is supplied to the counter 55 as the clock signal 61, and the memory 47 has the address 2 accessed. In this state, the A- and B-phase driver circuits 44A and 44B and of the first detection voltage dividing transfer circuit 43A come into operation. In this case, about 1A of exciting current flows to the A phase exciting coil 31A in the same direction (indicated by arrow 46A) as before at the A-phase, and a current counter (as indicated by arrow 48B) to the exciting current flowing to the B-phase exciting coil 31B at an initialized state (state of address 0) flows at the B-phase. In this case, the rotor steps to a position near the A-phase by a given angle with its pole tooth 71 passing the A-phase stator pole tooth 72A in the direction indicated by arrow 73. (FIG. 8 at (d)).

When 0.5 msec passes after the address 2 of the memory is accessed, the third pulse $P_3$ is supplied to the counter 55 as the clock signal 61, and the address 3 is accessed. In this state, about 1A of exciting current flows to both the A- and B-phase exciting coils 31A, 31B. Exciting energies generated on the A- and B-phases are equalized, the pole tooth 71 of the rotor is attracted at an equal force by the pole teeth 72A, 72B$_2$ of the A-phase and B-phase stators, and the rotor steps so as to position just intermediately of the two. (FIG. 8 at (e)).

When 1 msec passes after the address 3 of the memory 47 is accessed, the fourth pulse $P_4$ is generated as the clock signal 61, and when the address 4 is accessed, a current flowing to the A-phase exciting coil 31A becomes 2/5 times the current flowing to the B-phase exciting coil 31B, and the exciting energy of the B-phase prevails over that of the A-phase. The rotor is consequently attracted more strongly to step in the pole tooth direction (indicated by arrow 73) of the B-phase stator and comes to a standstill with its pole tooth 71 coming between the pole teeth 72A and 72B of the A-phase and B-phase stators at a position near the latter by a given angle. (FIG. 8 at (f)).

The step motor is driven by repeating a series of operations as described above. In this case, exciting currents, the values of which have trapezoidal transitional form flow to the A- and B-phase exciting coils 31A and 31B, and the sum indicates a stepwise change as shown in FIG. 4 at (b). Thus it can be appreciated by examining FIG. 5 along with FIG. 8 that each step of the motor is constituted by four states or substeps. In the first state one phase (e.g., A-phase in the case of address 1) is excited with a large current and the other phase is not excited. In the second state both phases are excited, but one phase is excited with a large current (e.g., A-phase in the case of address 2) and the other with a small current (e.g., B-phase in the case of address 2). In the third state both phases are excited with the large or full current. In the fourth state both phases are excited but the currents applied are the reverse of the second state, i.e., the one phase is excited with the small current and the other is excited by the large current. The mean exciting current of each phase approximates a trapezoid.

In a carrier mechanism using a step motor driven by the step motor driving circuit, the time in which recording paper is at a standstill is set by an interval between the fourth pulse $P_4$ and the next occurrence of the first pulse $P_1$. In the embodiment, the interval is set at 2.5 msec as shown in FIG. 4a.

Figure 9:
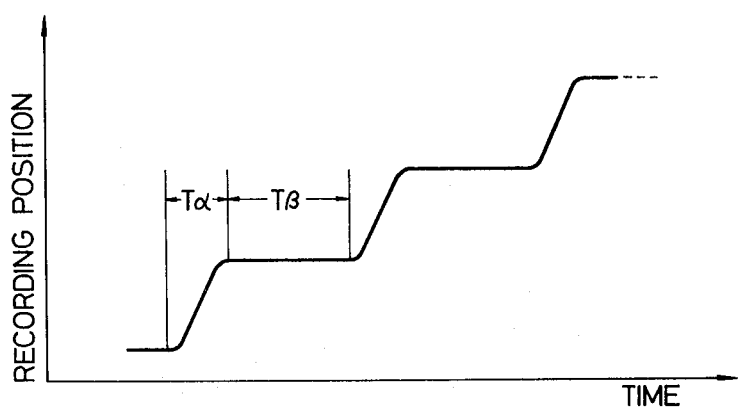

FIG. 9 represents a positional state of a rolled recording paper in the above carrier mechanism. Since a phase-shifted trapezoidal wave is supplied to an exciting coil of each phase from the step motor driving circuit, a still time $T_\beta$ long enough to allow the recording paper to move without inviting vibrations during its moving time $T_\alpha$ is reasonably obtainable.

According to the invention, the step motor is controlled in a sequence of double 1- and 2-phase excitation, therefore the circuit configuration is comparatively simplified and an economical system can be constituted.

Although concrete values of exciting current are given above for a specific embodiment of the invention, it should be understood that the values can be changed according to the components of the step motor and a desired step response characteristic. Also, instead of superimposing a rectangular wave on the reference voltage to be applied on the comparator, a triangular wave or other wave form changing regularly can be superimposed on the reference voltage.

What is claimed is:

1. A step motor driving circuit for a step motor comprising:
    (a) A-phase and B-phase exciting windings, said A-phase and B-phase windings being independent of each other;
    (b) first current selection means for selectively applying currents having a first current value, a second current value or zero value to said A-phase windings, said first and second exciting currents being of a predetermined ratio, said first being larger than said second, said first current selection means varying said currents between said values with a gradually changing waveform;
    (c) second current selection means for selectively applying currents having said first current value, said second current value or zero value to said B-phase windings, said second current selection means varying said currents between said values with a gradually changing waveform; and
    (d) control means for applying control signals to said first and second current selection means in a four state sequence of four successive control signal groups to cause the latter to excite said A-phase and B-phase windings in the following sequence of states: excitation of one of said phase windings with a current of said first current value and the other of said phase windings with a current of zero value; excitation of said one winding with a current of said first current value and the other winding with a current of said second current value; excitation of both phase windings with currents of said first current value; excitation of said one winding with a current of said second current value and excitation of said other winding with a current of said first current value, whereby each successive four state excitation constitutes one step of said step motor.

2. A step motor driving circuit as claimed in claim 1 wherein said first and second current selection means further include means for reversing the direction of said current applied to said exciting windings.

3. A step motor driving circuit as claimed in claim 1 wherein for each successive step of said step motor the applying of currents of said first and second current values by first and second current selection means to said one and said other windings during said four states is the applying of currents in the reverse direction from corresponding currents excited during the four states of the previous step.

4. A step motor driving circuit as claimed in claim 1 wherein the four successive states have time periods that are not all equal.

5. A step motor driving circuit as claimed in claim 1 wherein said first current selection means comprises:
  A-phase current sensing means for providing an A-phase sensing signal indicative of the current value through said A-phase windings;
  A-phase voltage dividing transfer circuit responsive to and dependent upon a control signal from said control means for selectively connecting said A-phase sensing signal or a divided portion of said A-phase sensing signal to an output terminal thereof;
  A-phase comparator means, having the output terminal of said A-phase voltage dividing transfer circuit connected to one input terminal thereof and a reference voltage connected to a second input terminal thereof, for comparing the signals on said two input terminals and providing a logic activating signal output signal only when said reference voltage exceeds the signal on said one input terminal; and
  A-phase driver circuit means responsive to the occurrence of said logic activating signal from said A-phase comparator and a control signal from said control means for connecting said A-phase windings to a source of power to cause current to flow in a first direction through said A-phase windings.

6. A step motor driving circuit as claimed in claim 5 wherein said first current selection driving means further comprises:
  $\overline{\text{A}}$-phase driver circuit means responsive to the occurrence of said logic activating signal from said A-phase comparator and a control signal from said control means for connecting said A-phase windings to a source of power to cause current to flow in a second direction through said A-phase windings.

7. A step motor driving circuit as claimed in any of claims 5 or 6 wherein said second current selection means comprises:
  B-phase current sensing means for providing a B-phase sensing signal indicative of the current value through said B-phase windings;
  B-phase voltage dividing transfer circuit responsive to and dependent upon a control signal from said control means for selectively connecting said B-phase sensing signal or a divided portion of said B-phase sensing signal to an output terminal thereof;
  B-phase comparator means, having the output terminal of said B-phase voltage dividing transfer circuit connected to one input terminal thereof and a reference voltage connected to a second input terminal thereof, for comparing the signals on said two input terminals and providing a logic activating signal output only when said reference voltage exceeds the signal on said one input terminal; and
  B-phase driver circuit means responsive to the occurrence of said logic activating signal from said B-phase comparator and a control signal from said control means for connecting said B-phase windings to a source of power to cause current to flow in a first direction through said B-phase windings.

8. A step motor driving circuit as claimed in claim 7 wherein said second current selection means further comprises:
  $\overline{\text{B}}$-phase driver circuit means responsive to the occurrence of said logic activating signal from said B-phase comparator and a control signal from said control means for connecting said B-phase windings to a source of power to cause current to flow in a second direction through said B-phase windings.

9. A step motor driving circuit as claimed in claim 8 wherein said reference voltage consists of a constant value voltage with a periodically varying voltage superimposed thereon.

10. A step motor driving circuit as claimed in claim 8 wherein said control means comprises a memory means having six control output terminals connected respectively to said A-phase driver circuit, said $\overline{\text{A}}$-phase driver circuit; said A-phase voltage dividing transfer circuit; said B-phase driving circuit; said $\overline{\text{B}}$-phase driving circuit; and said B-phase voltage dividing transfer circuit; the state of the signals on said control output terminals being dependent upon the address applied to said memory and the content of said memory at said address.

* * * * *